United States Patent [19]

Brodeur et al.

[11] Patent Number: 5,029,120

[45] Date of Patent: Jul. 2, 1991

[54] ELECTRICAL WAVEFROM GENERATOR MEANS AND METHODS

[75] Inventors: Lester Brodeur, Hudson, N.H.; John F. Melville, Danvers, Mass.

[73] Assignee: Analogic Corporation, Peabody, Mass.

[21] Appl. No.: 611,476

[22] Filed: Nov. 7, 1990

Related U.S. Application Data

[63] Continuation of Ser. No. 323,198, Mar. 13, 1989, abandoned, which is a continuation of Ser. No. 171,180, Mar. 21, 1988, abandoned, which is a continuation of Ser. No. 697,562, Feb. 1, 1985, abandoned.

[51] Int. Cl.$^5$ ................................................. G06F 1/02
[52] U.S. Cl. ..................................... 364/718; 84/605; 307/261; 328/14
[58] Field of Search ............... 364/487, 607, 718, 719, 364/721; 328/14, 178, 187; 307/261, 264, 268; 84/601–608; 341/147

[56] References Cited

U.S. PATENT DOCUMENTS

| | | | |
|---|---|---|---|
| 3,621,228 | 11/1971 | Paine et al. | 364/718 |
| 3,633,017 | 1/1972 | Crooke et al. | 364/718 |
| 3,772,681 | 11/1973 | Skingle | 328/14 |
| 3,822,380 | 7/1974 | Forgione | 328/14 |
| 3,913,028 | 10/1975 | Bosselaers | 328/14 |
| 3,922,536 | 11/1975 | Hampel et al. | 364/718 |
| 3,952,189 | 4/1976 | Fabricius | 364/718 |
| 3,967,100 | 6/1976 | Shimomura | 364/718 |
| 3,973,209 | 8/1976 | Nossen et al. | 328/14 |
| 3,978,326 | 8/1976 | Shimomura | 364/718 |
| 3,992,971 | 11/1976 | Chibana et al. | 84/1.11 |
| 4,064,423 | 12/1977 | Atkisson, Jr. | 328/14 |
| 4,072,851 | 2/1978 | Rose | 364/487 |
| 4,104,725 | 8/1978 | Rose et al. | 364/487 |
| 4,131,049 | 12/1978 | Okumura et al. | 84/1.01 |
| 4,135,422 | 1/1979 | Chibana | 84/1.01 |
| 4,255,790 | 3/1981 | Hondeghem | 364/487 |
| 4,283,768 | 8/1982 | Scott | 364/718 |
| 4,346,448 | 8/1982 | Insam et al. | 328/14 |
| 4,355,367 | 10/1982 | Masuzawa et al. | 364/718 |
| 4,375,061 | 2/1983 | Shoff | 340/111.1 |
| 4,438,503 | 3/1984 | White et al. | 364/721 |
| 4,495,586 | 2/1985 | Andrews | 364/487 |
| 4,599,703 | 7/1986 | Bilharz | 324/14 X |
| 4,680,726 | 7/1987 | Malka et al. | 364/718 X |

Primary Examiner—Joseph L. Dixon

[57] ABSTRACT

An electrical waveform generator and a method for electrical waveform generation are provided which includes a central processing unit (13) to first provide sequential points of a selectable waveform in digital form and store them in digital memory (15). A memory controller (14) then generates the waveform by sequencing those points through a digital to analog converter (17). Previous instruments required large memory capacity to handle all of the data points necessary to produce a wide variety of waveforms. The present invention uses mathematical notation to define and store selectable waveforms and calculates the data points when a curve is selected or defined for use. Memory controller (14) uses concatenated looping during the sequencing of points to the converter (17) for the purpose of making the data memory (15) more efficient. The single waveform generator of the present invention may be used in many of the various applications of waveform generators including automated test equipment having industry standard communication buses for control.

8 Claims, 7 Drawing Sheets

ELECTRICAL WAVEFROM GENERATOR MEANS AND METHODS

This is a continuation of copending application Ser. No. 323,198, now abandoned, filed Mar. 13, 1989, which in turn is a continuation of U.S. Ser. No. 171,180 filed Mar. 21, 1988, now abandoned, which in turn is a continuation of U.S. Ser. No. 697,562, filed Feb. 1, 1985, now abandoned.

The present application is related to the copending U.S. patent application of John F. Melville and Richard H. Weil entitled ELECTRICAL WAVEFORM GENERATOR MEANS AND METHOD and filed of even date herewith.

BACKGROUND OF THE INVENTION

1. Field of the Invention

The present invention generally relates to electrical waveform generators and, in particular, to such generators which produce an analog waveform output in response to sequences of digitally-represented values.

2. Statement of the Prior Art

Since the development of digital-to-analog converters, it has been possible to store electrical waveforms as digital information in the form of sequential amplitude values and to therefrom reproduce the electrical waveform so represented by sequentially coupling the digital amplitude values to a digital-to-analog converter. The various improvements that have been made in digital-to-analog converters have allowed and generally caused increased use of this technique for digitally storing and then reproducing an electrical waveform as an analog signal. The initial applications of this process were generally in the area of waveform display and measurement. However, as the circuitry for performing this technique underwent development, attempts were made at expanding the various applications due to the relatively great flexibility available in defining a waveform by its sequential amplitude values. Various improvements that have been made in the output circuitry are exemplified and explained by U.S. Pat. Nos. 3,621,228; 4,355,367; and 4,438,503. The waveform generators or synthesizers described by these patents operate directly in the sense of conditioning and converting digital information into a desired analog waveform. As is evident from the latter two of these patents, there has been increased emphasis on applying this general technique to various specific purposes such as the ones shown of generating audible and VOR waveforms. Interest in expanding the capabilities of this technique continues for the purpose of providing a flexible waveform generator which is useful for many applications.

Waveform generators themselves, have evolved from dedicated analog circuitry producing a limited number of defined functions such as sine waves, square waves, and the like, to the use of somewhat dedicated digital circuitry for producing somewhat variable functions. Such advanced instruments are exemplified by U.S. Pat. Nos. 3,922,536; 3,967,100; and 3,978,326. Such instruments have provided some flexibility by using circuitry which allows different waveforms to be defined. However, as the means for definition is still limited by the dedicated circuitry specified for this purpose, so too is the flexibility of the instrument.

Given the trends of development in the area of waveform generation techniques, it is apparent that there still exists a need for a highly flexible and adaptable waveform generator or synthesizer which may also be easily understood and applied by operators having various levels of training and capability.

SUMMARY OF THE INVENTION

Accordingly, a waveform generator is provided which enables a great deal of flexibility in the definition of the waveforms desired for synthesis. The present invention enables simplified packaging of the instrument along with a simplified control panel for operator use and/or a digital electrical interface for external control. The present invention includes an electrical waveform generator, comprising: digital means for specifying a desired analog electrical waveform as a mathematical function of time; means for digitally calculating amplitude values for the mathematical function for sequential points in time; means for storing the amplitude values; digital-to-analog converter means for outputting electrical waveforms in response to the stored amplitude values; and means for sequentially coupling the stored amplitude values to the digital-to-analog converter means for generating the desired analog electrical waveform. A further version provides means for digitally storing the mathematical function as specified and means for recalling the stored mathematical function. The present invention also includes a method of generating an electrical waveform, comprising the steps of specifying a desired electrical waveform as a mathematical function of time, calculating amplitude values for the mathematical function for sequential points in time, storing the calculated amplitude values, and sequentially converting the store calculated values to analog form for generating the desired electrical waveform.

BRIEF DESCRIPTION OF THE DRAWINGS

The present invention is illustratively shown and described in respect to the accompanying drawings in which.

DETAILED DESCRIPTION OF THE DRAWINGS

Figure 1:
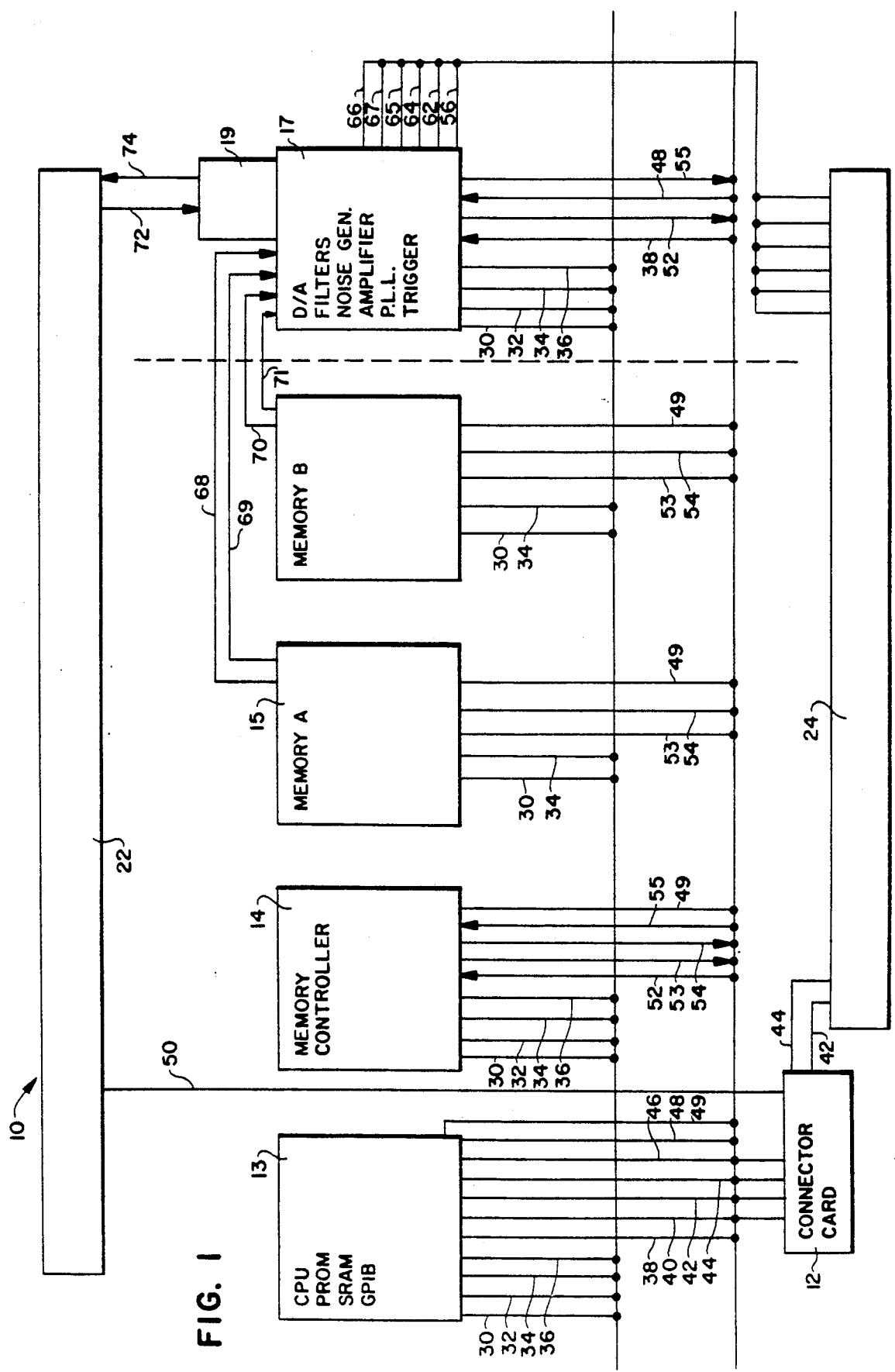
FIG. 1 is a system diagram of a waveform generator constructed in accordance with one embodiment of the present invention.

FIG. 1 is a system diagram of a waveform generator 10 generally including a plurality of printed circuit cards 12–17, a pair of interconnecting busses 18 and 20 and front and rear panels 22 and 24, respectively. The circuit boards 13–17 generally include the major circuit components of the waveform generator 10. Circuit board 13 includes a central processing unit, a programmable read-only memory, a static random-access memory, a general purpose instrumentation bus (GPIB, I.E.E.E. 488) interface, a floating point arithmatic unit and keyboard control circuitry. More particularly, the central processing unit would take the form of a microprocessor such as a Motorola 68000. The programmable read-only memory would include an operating program for the microprocessor. The static random-access memory would be used to store information such as mathematically defined electrical waveforms during operation of the generator 10. A battery back-up protects defined waveforms between periods of operation. The floating point unit would be used to calculate amplitude values for the defined waveform and could be included either as an integrated circuit or as a software feature for the microprocessor.

Circuit board 14 would include a memory controller for controlling the storing or recording of calculated sequential amplitude values and their subsequent sequential output from the generator. The necessary controller may be considered a state machine in that it includes a program for reading out each set of data points stored on cards 16 and 17. This read out program may be different for each set of data points and is read into the memory controller when its respective data points are read into memory. The read out program is generated by the CPU.

Circuit boards 15 and 16 would contain memory for storing the calculated amplitude values for use in readout. The presence of circuit board 16 would be determined by the memory requirements for the calculated amplitude values. In the event that either longer non-repeating waveforms are desired or higher output frequency rates are desired, circuit board 16 and its memory would be used to provide the additionally required capacity for stored amplitude values. Each memory card includes two 16 bit memory busses the data points from which may be interleaved together for providing an increased output rate.

Circuit board 17 includes the digital-to-analog converters, filters, an analog noise generator, an amplifier, phase-locked loop circuitry and other control circuitry. More particularly, the digital-to-analog converter is used to sequentially convert the stored amplitude values into analog voltages in reconstruction of the waveform represented thereby. The filters remove from the reconstructed wave the various transients generated in the conversion process. A noise generator is provided to purposefully generate a determinable level of white noise, thus allowing the waveform generator to simulate the real time condition of an information signal buried in transmission noise. The phase-locked loop circuitry would be used for controlling the timing of the sequential generation of analog amplitude values and thus the overall output frequency of the waveform generated.

Converter board 17 further shows an attenuator module 19 connected thereto. Attenuator module 19 includes the final output attenuators for analog signals generated by the circuit 10. It is configured in modular form to be easily replaceable as it is normally the portion most likely to experience failure in the event of improper connection of the output signal.

Circuit board 12 is a connector card generally including interconnections between the central processing card 13 and the front rear panels, back-up batteries for the static RAM of card 13, a low battery sensor circuit and a watchdog timer with a system reset.

Rear panel 24 generally includes connectors and a set of GPIB address selection switches. These switches are used to give each generator 10 an individual address when several guarantors are retworked on the same GPIB.

As previously mentioned, the circuit boards 12–17 are interconnected by a pair of busses 18 and 20. Generally, busses 18 and 20 are best selected in accordance with the microprocessor selected for the card 13. In the case of the Motorola 68000 microprocessor, busses 18 and 20 are included in a back-plane designated VMEbus which was developed by Digital Design, Inc. The CPU bus 18 is tied into each of the circuit boards 13–17 and includes multiplicities of signal lines or signal groups dedicated for specific purposes. More specifically, a signal group 30 including fourteen (14) lines, is used for delivering power to each of the circuit boards 13–17 and for this reason is connected to each of said boards. This group 30 is identified at each interconnection. Another group 32 includes twenty-three (23) lines and is used for address communication. Group 32 is likewise interconnected to circuit boards 13, 14 and 17. A signal group 34 including sixteen (16) lines, is used for communicating data between all of the circuit boards 13–17. A signal group 36, including a total of forty-one (41) lines, is used in the bus 18 for control signals. Signal group 36 is connected to each of the circuit boards 13, 14 and 17.

An auxiliary bus 20 is interconnected to circuit boards 12–17 for handling various other signals necessary for operation of the generator 10. This bus 20 is divided into groups of signal lines in accordance with user needs. In the present application, one such group is the register select group 38 consisting of eight (8) lines. This group 38 may be interconnected as needed and is used to identify certain decoded addresses within the computing architecture. The register selects are made available because the decoding circuitry is present on the central processing board 13 and duplication can therefore be avoided on other boards. A singular control line 40 is the low battery signal from the low battery sensing circuit on connector card 12. The next signal group 42 includes seventeen (17) lines for the GPIB. Another signal group 44 of eight (8) control lines is used to input the selected GPIB address for the generator 10 into the CPU board 13. The following signal group 46 includes three (3) lines used for interfacing with the front panel 22. Generally any interface scheme may be used such as that which is employed for the IBM PC keyboard, which is used for the present instrument. Signal lines 48 and 49 are used for a trigger signal and a Run signal, respectively, these are described below.

The memory controller card 14 includes five signal groups 52–56 coupled to auxiliary bus 20. These groups include: a four (4) line Memory Clock signal 52, a single line Execute signal 55 and a Run line 49, which are being fed into the memory controller card 14; and a nineteen (19) line Memory Address bus 53, and a twenty-five (25) line Memory Control bus 54 which are being coupled from card 14 to auxiliary bus 20.

Memory cards 15 and 16 each receive the Memory Address bus signal 53, Memory Control bus signal 54 and Run signal 49 from auxiliary bus 20. The converter card 17 is coupled to auxiliary bus 20 receiving the Register Select signal group 38 and the Trigger signal 48. It also couples to the auxiliary bus 20 the Memory Clock signal 52 and the Execute signal 55.

Lastly auxiliary bus 20 connects the low battery signal 40, the general purpose instrumentation bus 42, GPIB, the GPIB address bus 44 and front panel bus 46 to the connector card 12. Connector card couples to a signal group 50 including five (5) lines connected to the front panel 22. This includes the three (3) lines designated 46 for the central processing card 13 with the addition of power and ground lines. GPIB bux 42 and GPIB address bus 44 are also coupled between connector card 12 and rear panel 24.

The further connections shown in FIG. 1 include a multiplicity of connections between the converter card 17 and the rear panel 24. These connections include a marker signal 56, a syncronization signal 62, reference clock input 64 and output 65 signals and gate-in 66 and gate-out 67 signals. These signals are each connected to a separate BNC connector on the rear panel 24. Further connections include the data signal groups 68–71 located between memory cards 15 and 16 and converter card 17. Each data line group 68–71 comes from a separate 16 bit memory section of its respective memory card.

Lastly, FIG. 1 shows connections 72 and 74 between the attenuator module 19 and the front panel 22. Both connections 72 and 74 are made to individual BNC connectors located on the front panel 22. Connection 72 includes a trigger line for allowing external triggering of the output signal from the instrument. Signal line 74 couples the output attenuators of the analog waveform generator 10 to a connector for outputting from the instrument 10.

Figure 2:
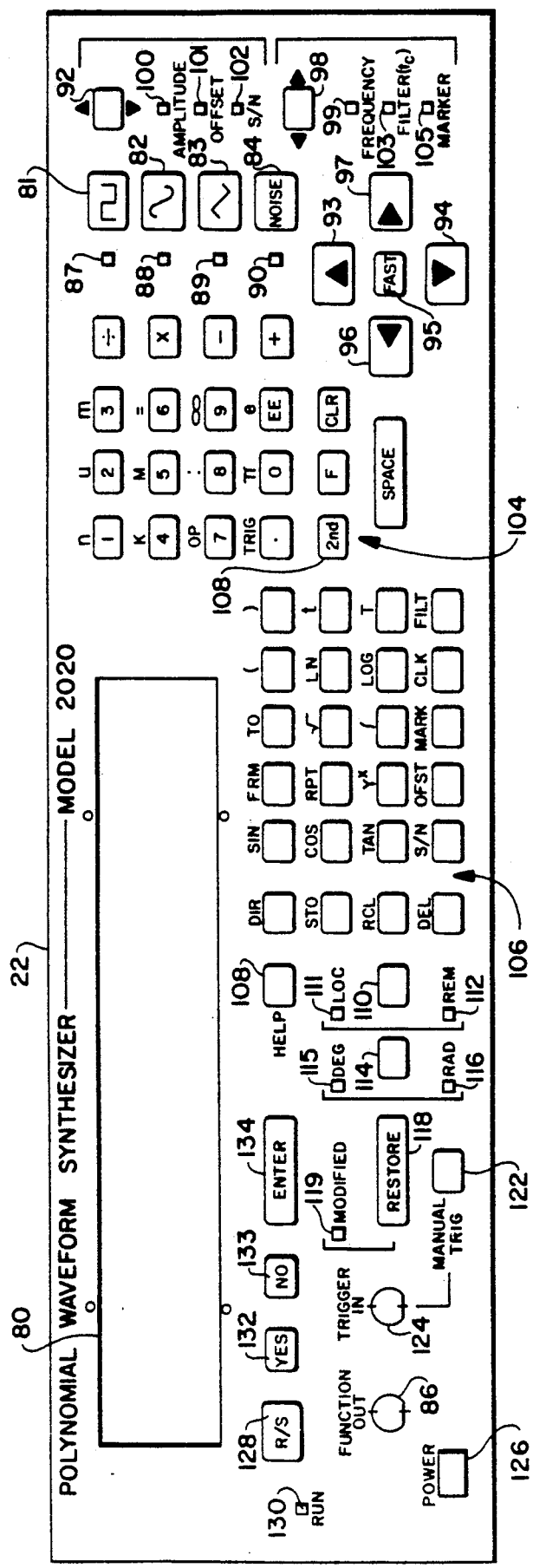
FIG. 2 is a front view of a control panel for use with the generator of FIG. 1.

FIG. 2 shows the front panel 22 of FIG. 1 generally including a display 80 and a multiplicity of control keys. Any suitable display may be used for the instrument 10. A preferred display for the present embodiment would have two rows of forty (40) characters and provisions for causing a cursor to appear under each character to indicate the character being addressed by the control keys. The keyboard 22 is controlled by its own separate microprocessor and uses the IBM PC keyboard standard for communication with the remainder of the instrument.

Keyboard 22 may be used to control the synthesizer 10 in one of four modes. The first mode is a direct function output mode including the use of keys 81–84. Keys 81–84 are exclusive and pressing one of them causes generation of the corresponding waveform shown. Key 81 corresponds to a square wave, key 82 to a sine wave and key 83 to a triangular or sawtooth wave. Key 84 courses just white noise to be generated. A selection of any of these functions is indicated by a respective indicator light 87–90 located immediately to the left of its corresponding key 81–84. While these functions are in use, their amplitude, offset and signal-to-noise ratio may be varied by the use of selector key 92, up-down directional keys 93 and 94 and fast key 95. To vary either the amplitude, offset or signal-to-noise ratio, key 92 is sequentially pressed until the corresponding indicator light 100–102 is eliminated for the desired aspect. Either one of the up down keys 93, 94 along with the fast key 95 may then be pressed to change the variable as it appears in the display 80. Choosing the signal-to-noise feature of light 102 interjects a noise signal into the previously selected signal.

Likewise, frequency variation, filtering and separate marker features may be selected for an output signal by use of the selector key 98 and varied by left, right and fast keys 96, 97, 95, respectively. Selector key 98 is pressed until the desired indicator light 99, 103 and 105 is illuminated and the corresponding function is then adjusted by the use of keys 95–97. This arrangement may also be used to provide a symmetry adjustment for the square and triangular waves.

The second operational mode of the synthesizer 10 provides the function mode which includes the use of standard mathematical notation for definition of a function, calculation of points in accordance with that function and outputting of the calculated points in analog form. The function mode is generally controlled by two matrices 104 and 106 of keys. Matrix 104 includes 20 keys of which 12 are double function keys. The primary or single function of each key is indicated within the outline of that key. The secondary function for the 12 keys located in the upper left hand corner of the matrix, is indicated above the key. The second function may be selected by pressing the single function key 108 and the corresponding double function key. Moving from left to right and top to bottom, the primary or single functions provided are 1, 2, 3, divide, 4, 5, 6, multiply, 7, 8, 9, subtract, decline point, 0, EE, addition, second function selection, select a named function, clear and space. The second function provided for the 12 double function keys moving again from left to right and top to bottom are nano, micro, mili, kilo, mega, equals, operation, colon, infinity, trigonometric function, and the constants pi and e.

Matrix 106 is a 6-column by 4-row matrix with the first or left hand column slightly separated and used exclusively for direct control functions, whereas the remainder of the keys of matrix 106 are used for function definition. The direct control functions of the left column keys are directory, store, recall and delete. The function specification functions provided by the remainder of matrix 106 are, from left to right and top to bottom, sine, from, to, left parenthesis, right parenthesis, cosine, repeat, square root, natural log, small t or local time base, tangent, exponent, integrate, log, T or master time base, signal-to-noise ratio, offset, marker, clock, and filter.

Pressing any one of the keys in either matrix 104 or 106 generally tells the synthesizer to operate in the function specification mode. Pressing the keys in these matrices causes their functions to appear on the display 80 and thusly the desired function may be mathematically noted for use by the central processing card 13 in calculating the values of the function.

Another mode of operation, at least for front panel 22, may be referred to as the "draw" mode. This mode would typically be invoked by pressing key 108 to select the secondary function and key number 7 to select the operation mode along with another key to identify the "draw" operation. In this mode, an output waveform from connector 86 is coupled to a display means such as an oscilloscope (not shown) and a marker signal generated on converter card 17 and outputted through rear panel 24 by line 56 is coupled to a second trace on the scope. The marker may be moved along the waveform and the amplitude of the indicated point may be varied using keys 93–95. Such an operation would allow easy insertion of a glitch or similar signal in the middle of a normally defined function. The use of this feature would not be stored in the mathematical definition of the waveform but would be stored in the amplitude data points.

The final mode of operation is control of the synthesizer 10 by the general purpose instrumentation bus, GPIB. Typically a signal would be transmitted to the synthesizer over the GPIB which would include a header indicating the size of the data block to be transmitted, the number of times it was to be repeated in generation of the wave form and optionally a name for easy reference to the data. The header would be followed by the data block. The practice of naming a data block has particular usefulness in the application of automatic testing equipment where different data blocks may be initially loaded and then conveniently outputted as desired during a test procedure.

Front panel 22 also includes further keys for enabling operation of the synthesizer 10. A help key 108 causes instructions to appear in the display 80 to aid the operator. A local/remote selector key 110 allows the operator to lock out the keyboard in favor of the GPIB or return to local control after receiving a GPIB signal. Indicator lights 111 and 112 indicate the condition of this selector. This selector is a requirement of the IEEE 488 GPIB. A key 114 allows selection of the units for angular notation of either degrees or radiants and its condition is indicated by lights 115 and 116. The restore key 118 may be used in conjunction with the modified indicator light 119 when a function has been recalled from memory and shown on display 80 with subsequent modifications. When the modifications are made "Modified" light 119 is illuminated. The modified function may then be stored separately and the original function may be recalled by pressing the restore key 118.

A manual trigger key 122 is provided for manually inserting a trigger during an editing mode of operation. A BNC connector 124 is also provided to receive the external trigger signal allowed along line 72 of FIG. 1. Power switch 126 energizes and de-energizes the synthesizer 10 except for the static RAM on board 13 which is battery protected. A R/S key 128 controls function outputting between either a run or stop condition and is indicated by a light 130. Yes and No keys 132 and 133 allow questions to be answered during either the function specifying mode or the help mode of operation. An Enter key 134 may be used to accept a mathematically defined function after it has been inputted in the function mode.

As mentioned above, the synthesizer 10 may be easily operated in any of its four functional modes. Simple square sine or triangular waves may be easily generated with or without noise by simply pressing one of the keys 81–84. The amplitude, offset, signal-to-noise ratio, frequency filtering, markers and symmetry of some or all of these signals may be easily controlled by selecting the parameter to be controlled via the keys 92, 98 and either raising or lowering the value of that parameter by using keys 93–97. The function specification mode of operation may be easily engaged by using matrices 104 and 106. The function may first be defined using the standard mathematical notation shown for the keys. Once defined, the function may be entered for the purpose of calculating the data points to be outputted by pressing the Enter key 134. The function may also be stored in its mathematically noted form by using the store key in matrix 106. For the purposes of storing the mathematical function, a name or function number is assigned to the function so that it may easily be recalled by simply pressing the recall key of matrix 106 and the F key and the appropriate number keys of matrix 104. Previously stored signals may be identified on display 80 by pressing the directory key 'DIR'. Once the equation has been entered and its points calculated, the output function may be switched on by pressing the R/S key 128 to cause the run light 130 to be illuminated. This causes the calculated points to be outputted in analog form via the function out connector 86. If the function so generated is not satisfactory changes may be made in the mathematical definition and the changed function entered for calculation and outputting, or else the waveform being produced may be displayed and changed using the "draw" mode. If any changes are made, the "modified" light 119 is illuminated. Thereafter, the function may be stored back into memory in its mathematical notation form. If the changes are not satisfactory and the original function is desired, the restore key 118 may be pressed to eliminate those changes and cause the original function to again be displayed in the display 80.

A special feature is available from the keyboard in mathematically defining waveforms. More than one mathematical function may be used and these functions may be chained together or concatenated as sequential time periods. In other words, a desired waveform may be divided into sections of time and a different mathematical function may be used to define each section. This adds a high degree of flexibility to the definition of waveforms and significantly enhances use of the generator 10 in automated test procedures.

Figure 3:
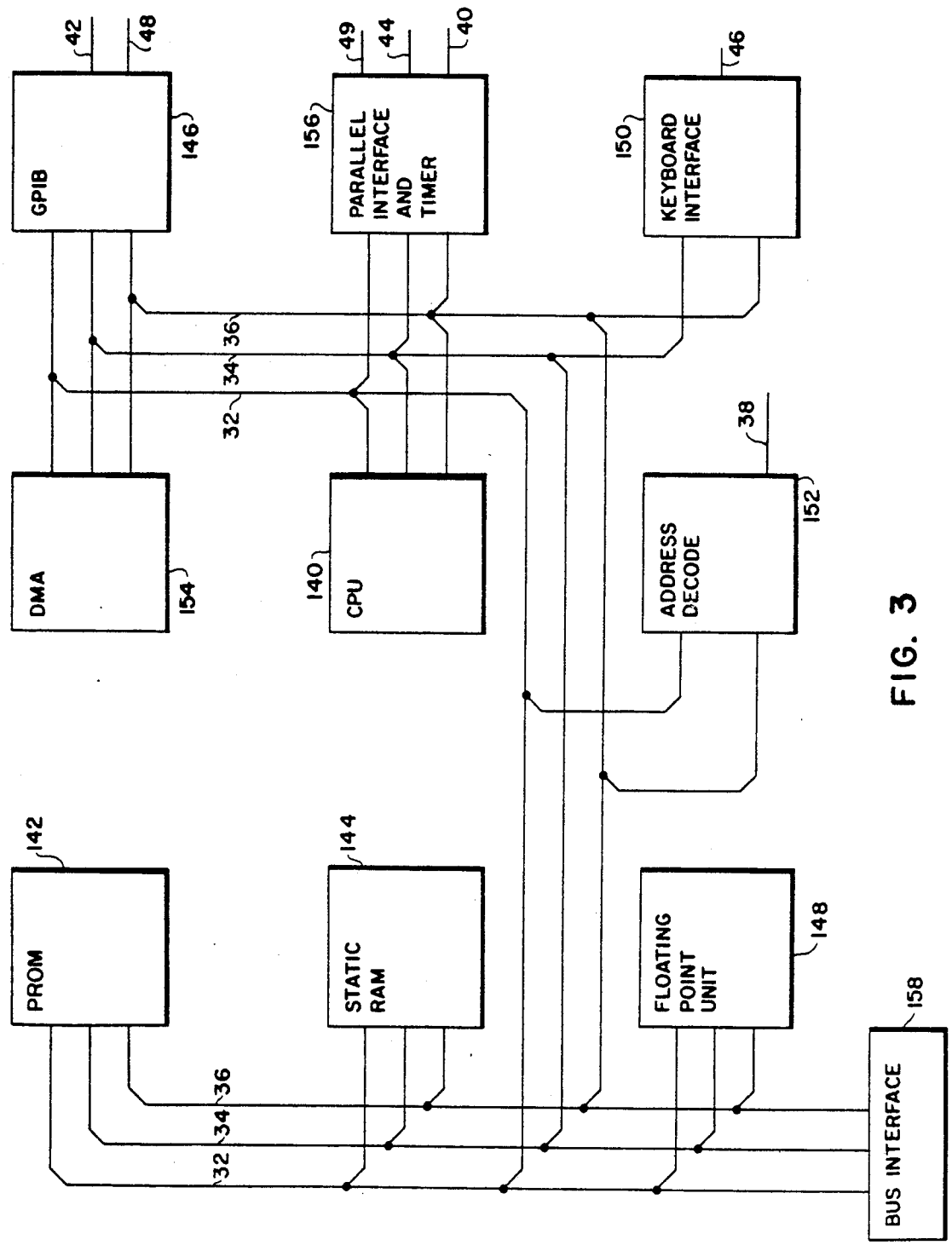
FIG. 3 is a block diagram of central processing board 13 of FIG. 1.

FIG. 3 is a block diagram of the central processing card 12 of FIG. 1. Generally included are a central processing unit 140, a programmable read-only memory 142, a static random-access memory 144, a GPIB interface 146, a floating point arithmatic unit 148, a keyboard interface 150, an address decoder 152, a direct memory access controller 154 and a parallel interface and timer circuit 156. These circuits are all interconnected by three groups of signal lines from the CPU bus 18, namely address 32, data 34 and control 36. The address decoder 152 only receives the address 32 and control 36 groups, and keyboard interface 150 only receives the data 34 and control 36 groups. A nominal bus interface 158 is also shown.

Additional lines are coupled to the circuits shown. Most of these additional lines are coupled through the bus interface 158 to auxiliary bus 20. The address decoder 152 is coupled to the register select signal group 38 and through a plurality of lines (not shown) for activating these intergrated circuits in response to the decoded addresses. Presently, register select group 38 is only used to address circuits on the converter board 17. The keyboard interface 150 is coupled to the 3-line signal group 46. The GPIB circuit is coupled to the 17-line GPIB signal group or bus 42 and trigger line 48. The parallel interface and timer circuit 156 connects to the low battery line 40, Run line 49 and the 8-line signal group 44 for GPIB address selecting.

Generally speaking, the CPU 140 controls the activity of the other circuits on the CPU card and the interface with the remainder of the boards 14–17 via the busses address 32, data 34 and control 36. CPU 140 operates in accordance with a program stored in PROM 142 and signals received from the keyboard interface 150. Given the functional and physical description of the synthesizer 10 set forth in this document, it is within the ability of someone skilled in the art of microprocessor programming to develop a program for PROM 142 which is suitable for operating the synthesizer 10 in the manner claimed for the present invention. Electrical functions which are defined via the keyboard interface 150 may be stored in the static RAM 144 which has a battery back-up on connector board 12 to maintain storage while the generator 10 is either disconnected or simply shut off.

The CPU 140 further controls the floating point arithmatic unit 148 for calculation of amplitude values for the mathematically defined electrical functions. As an alternative embodiment, floating point unit 148 may be included as part of the software in PROM 142.

After calculation, the amplitude values are transmitted via data bus 34 to memory cards 15 and 16 for storage. Data points may further be directly input via the GPIB; in which case the direct memory access chip 154 enables the GPIB to be directly coupled to memory cards 15 and 16 via the data bus 34 for the direct transfer of those data points. The inclusion of the direct memory access circuit 154 is optional. Parallel interface and timer circuit 156 provides further interface between CPU card 12 and the remainder of cards 14-17. Run signal 49 is activated in circuit 154 which causes memory controller card 14 to deliver stored data points from memory cards 15 and 16 to converter card 17. The address switch for the GPIB is read from address switch bus 44 to alert CPU 140 to a GPIB signal.

Figure 4:
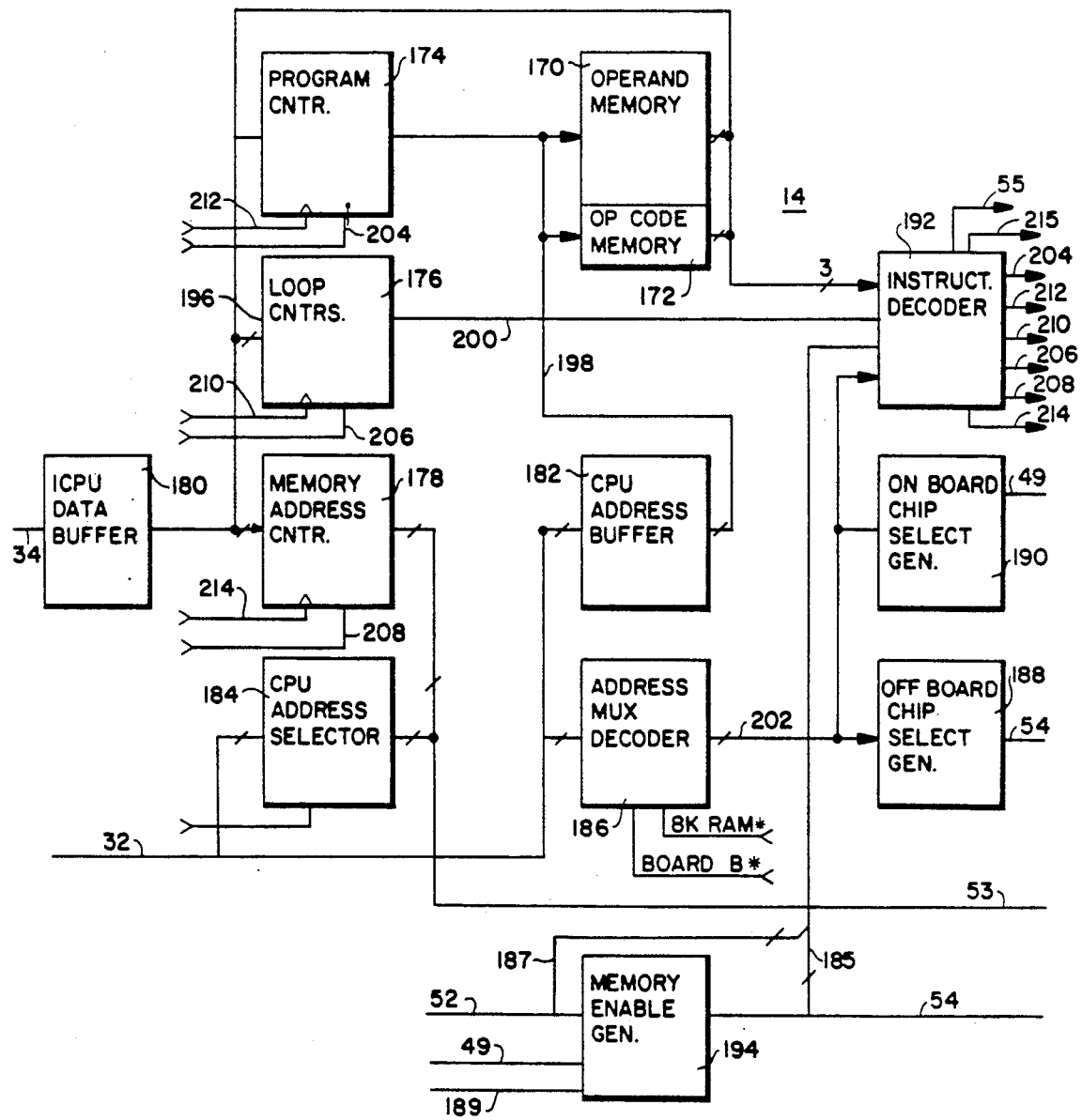
FIG. 4 is a block diagram of memory controller board 14 of FIG. 1.

FIG. 4 shows a block diagram of the memory controller card 14 of FIG. 1. Generally included are an Operand memory 170 for storing operation data, an operation code memory 172 for storing operation instructions, a program counter 174, loop counters 176, a memory address counter 178, a CPU data buffer 180, a CPU address buffer 182, a CPU address selector 184, an address decoder 186, an off-board chip select generator 188, an on-board chip select generator 190, an instruction decoder 192 and a memory enable generator 194. CPU data buffer 180 has data bus 34 as its input and a separate data bus 196 for its output. Data bus 196 is also connected to memory address counter 178, loop counters 176, program counter 174, operand memory 170, operation code memory 172 and instruction decoder 192. Another input to memory controller card 14 is address bus 32. This bus is coupled to CPU address selector 184, CPU address buffer 182 and address decoder 186. The memory address counter 178 and CPU address selector 184 have as their output the memory address bus or signal group 53. CPU address buffer 182 has as its output an address bus 198 which is also coupled to operand memory 170, operation code memory 172 and program counter 174. A signal group 200 is coupled from the output of loop counters 176 to instruction decoder 192 to indicate a zero count for the counters 176. Address decoder 186 includes a 3-line output 202 coupled to off-board chip select generator 188, on-board chip select generator 190, and instruction decoder 192. The execute signal line 55 is also coulped to instruction decoder 192.

The functions of the various chips and circuits shown in FIG. 4 are as follows. Operand memory 170 and operation code memory 172 store instructions for use in the outputting of data points stored on memory cards 15 and 16. Memories 170 and 172 may be constituted by a single memory having sufficient width to handle the operation data and operation codes in parallel. Program counter 174 is used to clock memories 170 and 172 through their sequential steps to perform that outputting. Loop counters 176 are used to count loops of sets of data points thus enabling sets to be repeated to thereby constitute a larger set. Although only one loop counter is shown in FIG. 4, it represents two or more identical counters which may be simultaneously used to output loops of data points. Each counter is identical and includes the same interconnections. Simultaneous use enables nested looping of output data points. The ability to loop in this manner enables the size of data point memories 15 and 16 to be substantially reduced relative to the number of data points needed. Memory address counter 178 provides the memory addresses actually used to read out data points from cards 15 and 16. CPU address selector 184 enables the address bus 32 to directly address the memory points of cards 15 and 16 during read and write operations. CPU data buffer 180 and CPU address buffer 182 respectively enable the inputting of data and addresses from busses 34 and 32. Instruction decoder 192 receives its input from the operation code memory 172 and generates a plurality of control signals therefrom. These control signals include a jump signal on line 204 coupled to program counter 174, load loop counter signals on line 206 coupled to loop counters 176, a load memory counter signal on line 208 coupled to memory address counter 178, loop count signals on line 210 also coupled to loop counters 176, a program counter clock signal on line 212 also coupled to program counter 174 and a memory address clock signal on line 214 also coupled to memory address counter 178 and a stop signal on line 215.

A BOARD B signal line 216 and an 8K RAM signal line 217 are coupled to address decoder 186 to signal the presence of memory board 16 and the size of the memory chips on boards 15 and 16 respectively.

On-board chip select generator 190 is coupled by lines not shown to operand memory 170, operation code memory 172, buffers 180 and 182, memory address counter 178 and program counter 174 to control their operation during the transfer of data between CPU 140 and memories 170 and 172. Off-board chip select generator 188 is used in the addressing of memory chips on boards 15 and 16 via a bus 218 during both read and write operations.

The memory enable generator uses the four-phase memory clock signal 52 generated on the converter board 17 to produce sixteen (16) distinct signals for sequentially enabling memory circuits on memory cards 15 and 16. The memory enable generator 194 can be reset by a Block Start signal on line 189 and is enabled by the Run signal 49. Two lines 187 of the memory clock signal 52 and one line 185 of the output of memory enable generator 194 are connected to the instruction decoder 192.

There are three (3) major modes of operation for the memory controller of FIG. 4. The first mode of operation includes the writing of data points into the memories of cards 15 and 16. The second mode of operation includes the writing of data into the operand memory 170 and the operation code memory 172. The third mode of operation includes the use of data stored in memories 170 and 172 to output the data points stored on cards 15 and 16.

During the write operation for memory boards 15 and 16, the memory controller of FIG. 4 causes the address bus 32 to be used to address the memories of cards 15 and 16 via busses 53 and 54. To accomplish this, on-board chip select generator 190 disables buffer 182 and enables CPU address selector 184, address decoder 186 and off-board chip selector generator 188.

During the second mode of operation, data is being fed into the memories 170 and 172. To accomplish this chip select generator 190 enables buffers 180 and 182 causing address buffer 182 to address memory locations of memories 170 and 172 while data buffer 180 is simultaneously supplying data points via bus 196 to the data inputs of memories 170 and 172. Also, program counter 174 and memory address counter 178 may be directly preset by CPU 140 via busses 196 and 34, respectively. The data which is so read into memories 170 and 172 controls the outputting of data points from cards 15 and 16. This data is generated specifically for each mathematical function defined on CPU card 13 and for each block of data read in over GPIB bus 42. This data is generated by CPU 140 under the control of the program located in PrOM 142.

During the third mode of operation, program counter 174 is clocking the address inputs of operand memory 170 and operation code memory 172 causing the data stored therein to appear on the lines of data bus 196. Data from the operation code memory 172 is fed to the instruction decoder 192 causing the appropriate control signals to be generated for the various circuits of the controller 14.

As the operation instructions are generated by the instruction decoder 192, the corresponding operation data is being simultaneously clocked from operand memory 170 onto data bus 196. When instruction decoder 192 activates the jump signal line 204 the data present on bus 196 is read into the program counter 174. At the next program counter clock signal on line 212, the output of program counter 174 is latched to the value of the data previously inputted. Subsequent program counter clock signals cause counting from that loaded number. Likewise loop counter 176 may be loaded and counted down via load loop counter and loop signals present on lines 206 and 210 respectively. Memory address counter 178 may also be driven in a similar manner.

By the arrangement described for memory controller 14, instructions may be stored in operand memory 170 and operation code memory 172 which cause data stored on memory cards 15 and 16 to be repetitively read out in a great variety of patterns. This enables a limited amount of data in memories 170 and 172 and a limited amount of amplitude data points in cards 15 and 16 to create a large bank of different and varying waveforms. It is even possible to program the generator to store waveforms for different test procedures and only call for singular waveforms as desired. This may be done by generating a stop code signal for line 215 in the operation code memory 172. Thusly, an entire complicated and varying test procedure may be performed by loading the generator once and then starting it only when the different desired waveforms are required.

A loop of data readout would be controlled by controller 14 in the following manner. Data in memories 170 and 172 at the beginning of a waveform loop would first load the program counter 174 causing the memories 170 and 172 to be addressed at the loaded location. Next, loop counter 176 would be loaded with the number of loops desired to be generated from the given set of data on memory cards 15 and 16. Next, memory address counter 178 would be loaded with the beginning address of the data. This will enable data points to be read from memory cards 15 and 16. The next instruction is operation code memory 172 is a loop instruction. When this instruction is reached, program decoder 192 checks the appropriate line of bus 200 to see if the respective loop counter 176 is zero. If it is not zero, decoder 192 decrements that counter 176 and returns the memory 172 to the previous load address counter instruction. This instruction requires an Execute signal 55 to be performed. The Execute signal is generated by the sixteenth beig of the lost data point in the loop being performed. When this beit is sensed and the Execute signal is generated, the load address counter instruction is executed and the loop is repeated. If the loop counter 176 is at zero, decoder 192 causes the program to proceed to the next instruction. This next instruction could require an Execute signal 55 and therefore be activated when the end of the loop is reached. By this method, any number of different loops may be performed limited only by the size of memories 170 and 172.

Figure 5:
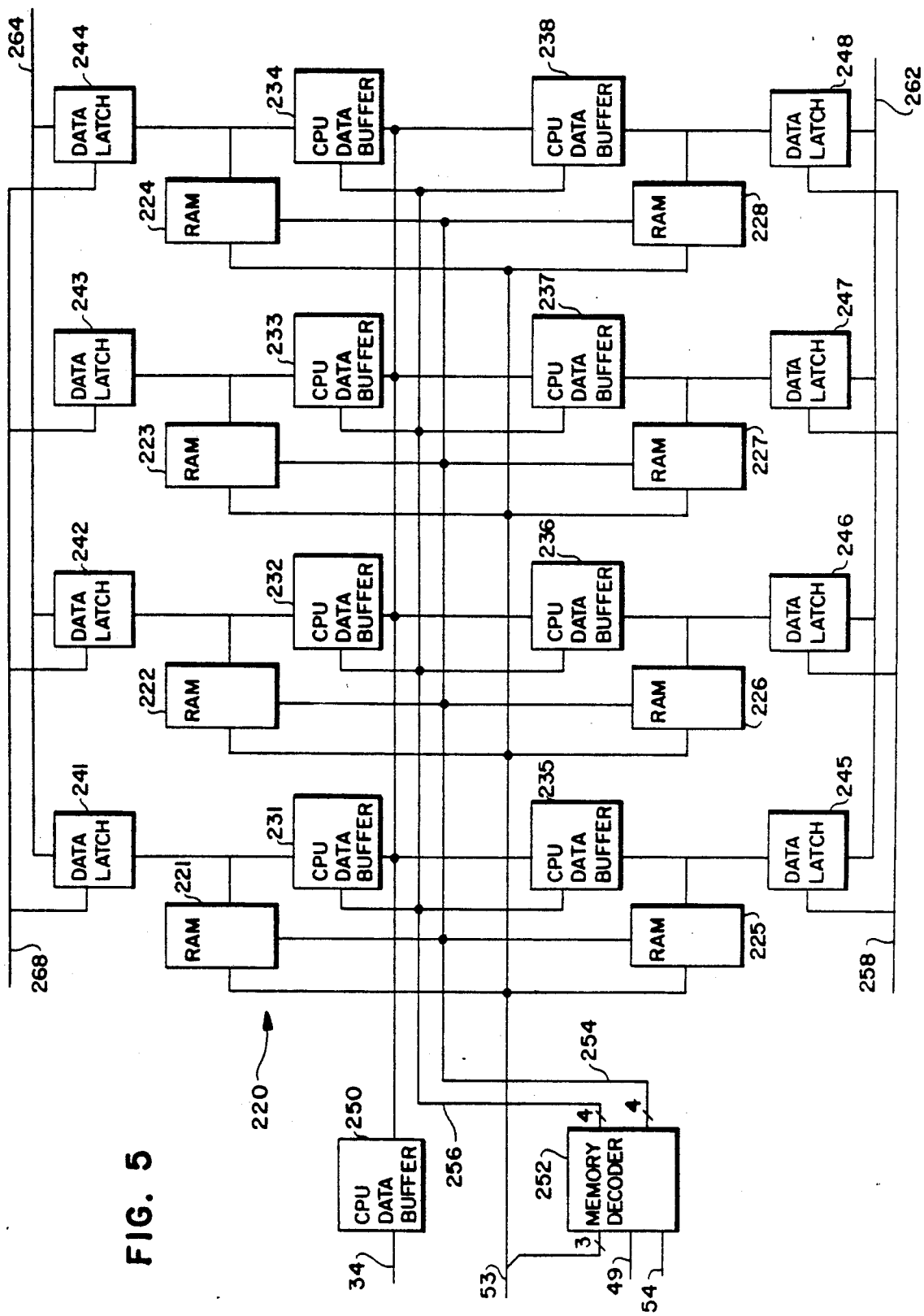
FIG. 5 is a block diagram of memory boards 15 and 16 of FIG. 1.

FIG. 5 is a block diagram of memory cards 15 and 16, which cards are identical. Memory circuit 220 generally includes eight (8) RAMS 221-228 each of which is sixteen (16) bits wide and may either be 2K or 8K deep. In practice each memory 221-228 is constituted by a pair of memories which is each eight (8) bits wide. Each of the RAMS 221-228 is fed by a respective CPU data buffer 231-238 via data input/output lines. Respective data latches 241-248 which are each 16 bits wide are further coupled to the same data lines for receiving output data. The memory circuit 220 is essentially fed from the data bus 34 and the memory address bus 53 of FIG. 4. A data buffer 250 interfaces bus 34 with the data buffers 231-238. A memory decoder 252 receives input from memory address bus 53, Run signal 49 and Computer Enable signals of bus 54 and generates therefrom a CPU enable signal on line 254 for each of the rams 221-228 and a memory chip select signal on line 256 for each of the data buffers 231-238. The remaining control of the memory circuit 220 is accomplished by sequencing lines 258 and 260, each of which includes four (4) separate lines for activating a separate one of the latches 241-248. Data output from latches 241-248 is provided by data busses 262 and 264. Depending upon whether memory circuit 220 becomes memory card 15 or memory card 16, busses 264 and 266 are either coupled to busses 68 and 69, respectively, or busses 70 or 71, respectively, of FIG. 1.

The arrangement described for memory circuit 220 enables interleaving of the data points from latches 241-248 so that the output rate is faster than the access rate for any of the singular RAMS 221-228. For example, the RAMS 221-228 may have an access time of 120 nanoseconds. A new address is coupled from address bus 53 to each of the RAMS 221-228 every 160 nanoseconds. A signal on the CPU enable line 254 causes the data at those locations to be coupled to data latches 241-248. These latches 241-248 are then sequentially coupled alternately to data busses 264 and 262 every 20 nanoseconds thereby filling the 160 nanosecond interval of memory access time. In the case of the presence of both memory cards 15 and 16, it is possible to output a data point to the converter card 17 every 10 nanoseconds resulting in an output sampling rate of 100 megahertz. Of course, the access times actually used for the RAMS 221-228 will depend upon the output sampling rate used for the analog signal. Where fewer output points are needed the RAMS 221-1228 are accessed more slowly and latches 241-248 are coupled to output busses 262, 264 more slowly than the times given above for the maximum output rates.

Lastly, in order to read data points out of memory they first must be written into memory. This is accomplished by presenting the data at the inputs of each of the buffers 231-238 and clocking the appropriate buffer via memory chip select line 256.

Figure 6:
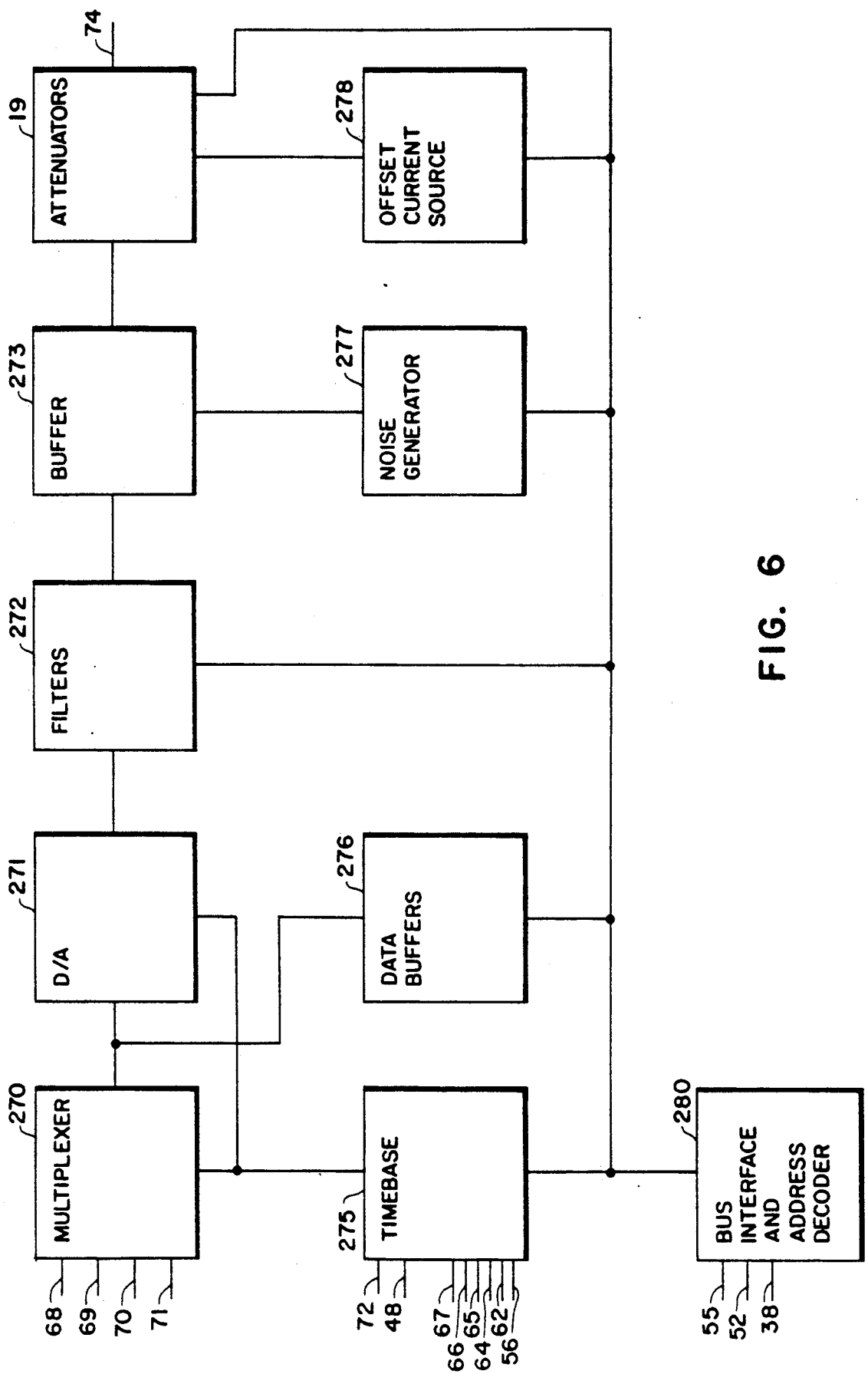
FIG. 6 is a block diagram of converter board 17 of FIG. 1.

FIG. 6 shows a block diagram of converter card 17. Generally included are a multiplexer 270 which receives data busses 68-71 as its inputs and presents an output to D-to-A converter 271. Converter 271 is outputted to a filter circuit 272 which in turn is outputted to a buffer 273. Buffer 273 feeds its output to an attenuator module 19 the output of which is the output line 74 in FIG. 1. Also included is a time base generator 275 which clocks multiplexer 270 and converter 271. Time base 275 also generates the phase-lock loop signal for bus 52 and the signals 56, 62 and 64–67 for coupling through rear panel 24. A data buffer 276 can read data from multiplexer 270 and to and from converter 271. A noise generator is coupled to buffer 273 and may alternately be coupled to the input of filter circuit 272. An offset current source 278 is coupled to attenuator 274 and a bus interface and address decoder 280 is coupled to time base generator 275, data buffer 276, filter is 272, noise generator 277, offset current source 278 and attenuator 19.

Multiplexer 270 receives data from data line 68–71 at different time intervals for interleaving. This multiplexing process completes the interleaving which enables a total output sampling rate of 100 megahertz with two (2) memory cards. The output of multiplexer 270 is a 12-bit data bus which feeds the input of D-to-A converters 271.

The output of converters 271 are coupled to the inputs of filter circuit 272 to remove any and all switching noise present therein. Filter 272 also enables the operator to set a desired frequency rolloff characteristic for the generated waveform. This is done with ten (10) selectable filter stages in circuit 272 and controlled by instructions from CPU 140 received via interface 280. Buffer 273 serves as an amplifier and as a mixer for the synthesized signal and the noise generator signal 277. By this means a selectable signal to noise ratio is available for the output signal.

As mentioned, the noise generator 277 may alternatively be coupled to the input of filter circuit 272. This arrangement would allow the noise signal to have the same frequency roll-off characteristics as the synthesized waveform. In this condition buffer 273 would still act as an amplifier.

Attenuators 19 enable further control of the output signal and further enable mixing with an offset current source 278 to provide the proper output impedance for the signal line 274. Withholding offset until the attenuators 274 allows greater flexibility in the headroom available in buffer amplifier 273.

Bus interface and address drive decoder 280 are used to provide control signals to each of the circuit elements shown in FIG. 6 thus making each element controllable and testable from CPU 140.

Figure 7:
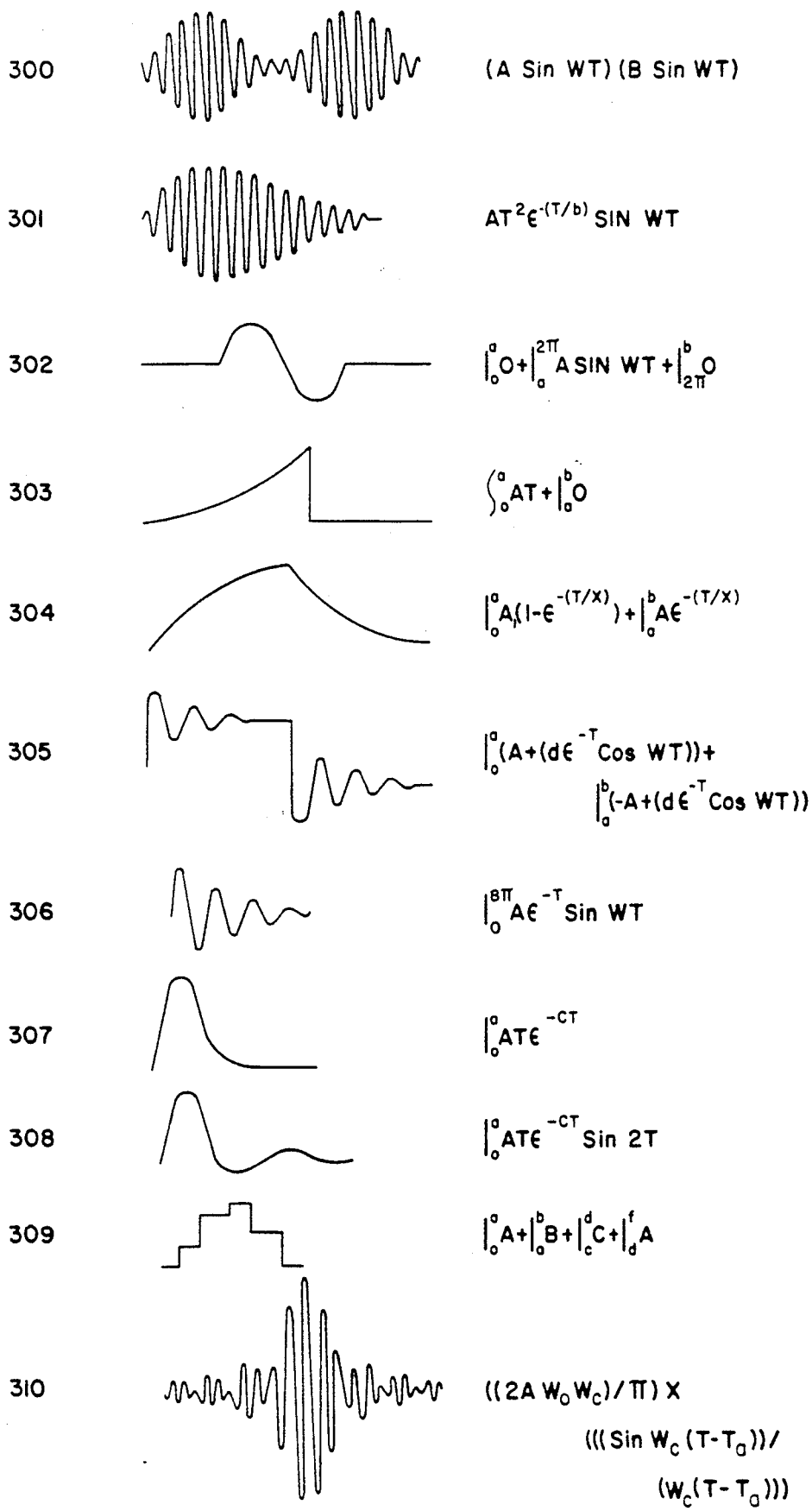
FIG. 7 is a graphic representation of waveforms which may be defined and generated in accordance with the disclosed embodiment of the present invention.

FIG. 7 is a graphical representation of various polynomial functions which may be defined by the generator or synthesizer 10 and their corresponding equations in mathematical notation. The left-hand column of FIG. 7 graphically represents the function generated and the right-hand column specifies the mathematical formula. The variety of waveforms 300–310 shown in FIG. 7 demonstrates the versatility of the present invention. However, the most significant impact is appreciated by the magnitude of the hard wired circuits which would have to be used to generate the same functions. Function 300 would normally require two (2) phase locked sine wave generators, a four-quadrant multiplier and a buffer. Waveform 301 would normally require a sine wave oscillator, a phase locked gate and carrier switch, an envelope function generator and again the multiplier and buffer.

Waveform 302, which comprises a single sine wave surrounded on either side by a base line function, demonstrates the ability of the generator 10 to synthesize a function having discrete sections in time, which sections may be defined independent of each other. More specifically, the first time period defines a zero base line from time zero to time (a), the second time period defines the sine wave function from time (a) to the angular function (2 (pi)), and the third time period defines again a zero base line from the angular position (2 (pi)) to the time (b). In this manner a waveform may be specified as different mathematical functions concatenated as sequential time intervals.

The discrete circuit necessary to generate waveform 302 would necessarily include a sine wave generator, an amplitude limiter, a digital divider, divider control circuitry, a divider decoder, a gate and a buffer. Waveform 303 would normally require for its generation a ramp generator, a differentiator and clamp, a divide by two circuit, an integrator switch and a driver. Waveform 304 would normally require a square wave generator with an external filter. Waveform 305 demonstrates the ability to use different offset values of plus and minus (A) for different time periods of the generated waveform. The normal circuitry required for this function would be a square wave generator and an external filter with dampening. The circuitry normally required to generate waveform 306 would be an impulse source and a tuned circuit with dampening. The circuitry normally required to generate waveform 307 would be an impulse source and a critically damped, tuned circuit with a driver. The circuitry normally required form waveform 308 would be an impulse source with an underdamped tuned circuit and driver. The circuitry normally required to generate waveform 309 would be a multitapped voltage divider, a multiple switch, switch logic, a switch driver and a buffer. The function of waveform 310 displays the ability to perform nested calculations within an equation. The hard wired circuitry required would include an impulse generator and a square symmetrical band pass filter and drives.

Thusly, it has been demonstrated that the single synthesizer of the present embodiment may be used as a versitile replacement for a large variety of hard wired circuits which replacement may be easily controlled by such versatile and widely known means as the IEEE 488 GPIB.

CONCLUSION

Thusly constructed, the present invention provides a highly versatile electrical waveform generator. The generator of the present invention takes advantage of digitial-to-analog conversion techniques for enabling complete flexibility in determining the waveforms produced while also allowing the use of standard mathematical notation to be used for the defining and storage of functions for future use. Such methods of definition necessitate a minimum amount of storage capacity for a great variety of electrical functions. Further, concatenating functions greatly increases the flexibility of defining functions without sacrificing storage efficiency. This in combination with external control via a GPIB enable a single generator of the present invention to make available to automatic test equipment a tremendous resource of test signals thusly allowing much simplification of testing systems and procedures.

Of course, it is intended that the embodiment of the present invention described above be taken in an illustrative and not a limiting sense and that various modifications and changes may be made to this embodiment by persons skilled in the art without departing from the scope of the present invention as defined in the appended claims.

What is claimed is:

1. An electrical waveform generator for generating a plurality of different electrical waveforms, said generator comprising:
    (a) digital storage means for storing a plurality of sequences of digital amplitude values, each sequence representative of analog amplitude values defining a corresponding one of said waveforms;
    (b) means for selectively retrieving from said storage means any one of said digital amplitude value sequences representative of the analog amplitude values defining a selected waveform at any one of a plurality of predetermined clocking rates so that the period or cycle of the selected waveform can be preselected;
    (c) digital-to-analog converter means for converting said selected digital amplitude value sequence at any one of said clocking rates into and generating the selected waveform as a function of said clocking rate;
    (d) input means for entering any preselected mathematical expression in mathematical terms and representative of a corresponding waveform; and
    (e) means for processing the mathematical expression so as to generate a sequence of digital amplitude values representative of the amplitude values defining the corresponding waveform represented by said mathematical expression so that said generated sequence of digital amplitude values can be stored in said digital storage means.

2. The electrical waveform generator according to claim 1, further including means for storing said mathematical expression.

3. The electrical waveform generator according to claim 1, further including means for reading sequential amplitude values from an external data source into said digital storage means.

4. The electrical waveform generator according to claim 1, further including means for generating electrical noise and for adding said noise to the selected waveform provided by said digital to analog converter means.

5. The electrical waveform generator according to claim 1, further including means for generating said selected waveform periodically.

6. The electrical waveform generator according to claim 5, further including phase-locked loop means for controlling the periodic generation of said selected waveform.

7. The electrical waveform generator according to claim 1, further including display means for displaying said generated waveform, and input means for entering commands for modifying the original amplitude value at a selected point of the displayed generated waveform and for storing the modified amplitude value so as to replace the corresponding original amplitude value.

8. The electrical waveform generator according to claim 1, wherein said input means for entering a mathematic expression representative of a corresponding waveform includes means for specifying said waveform as a plurality of different mathematical functions concatenated as sequential time intervals.

* * * * *